Oct. 10, 1933. T. E. MURRAY, JR 1,929,898
METHOD OF FORMING ELECTRICALLY WELDED HOLLOW OBJECTS
Filed March 16, 1929   2 Sheets-Sheet 1
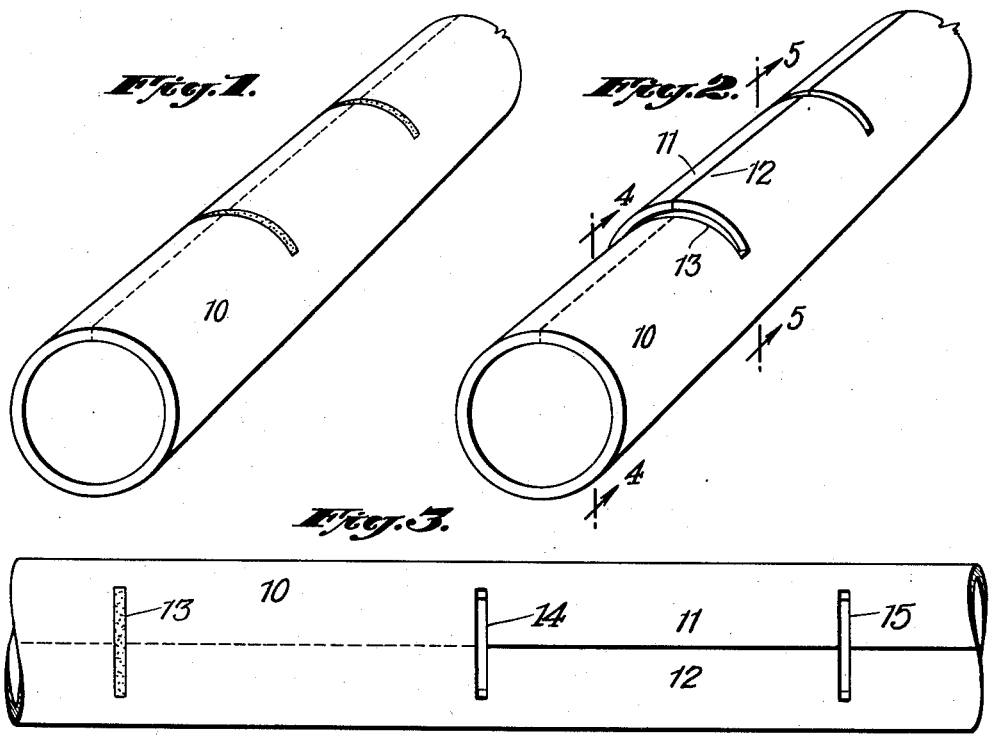
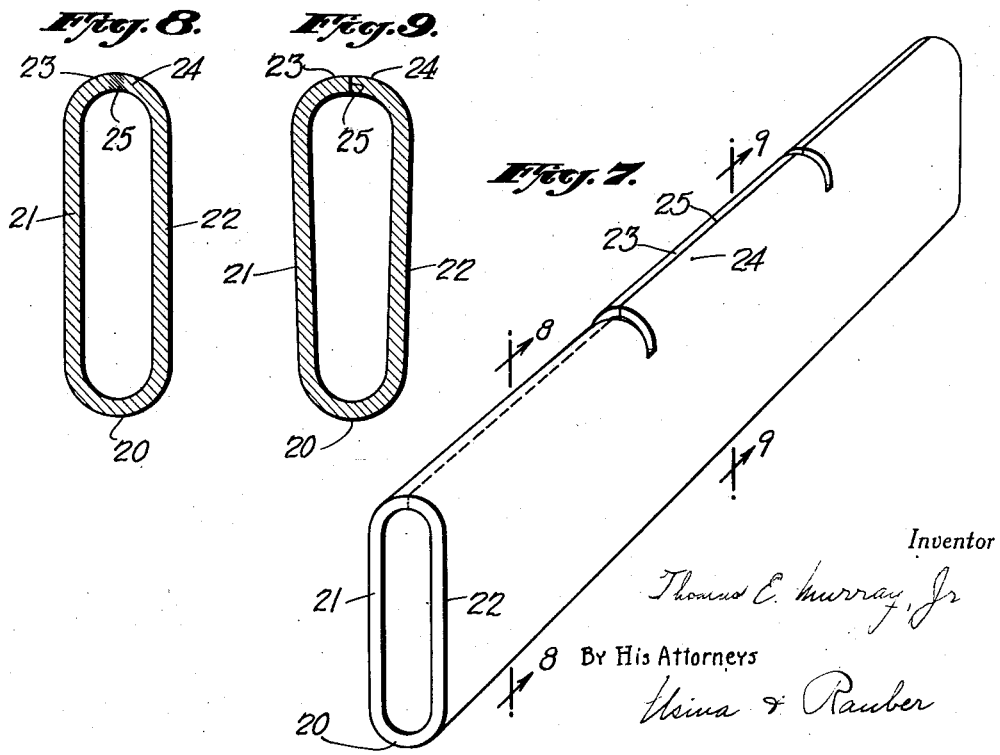
Inventor
Thomas E. Murray, Jr
By His Attorneys Oct. 10, 1933. T. E. MURRAY, JR 1,929,898
METHOD OF FORMING ELECTRICALLY WELDED HOLLOW OBJECTS
Filed March 16, 1929  2 Sheets-Sheet 2

Inventor
Thomas E. Murray, Jr.
By His Attorneys

Patented Oct. 10, 1933

1,929,898

UNITED STATES PATENT OFFICE 1,929,898

METHOD OF FORMING ELECTRICALLY WELDED HOLLOW OBJECTS

Thomas E. Murray, Jr., Brooklyn, N. Y., assignor to Metropolitan Engineering Company, a corporation of New York Application March 16, 1929. Serial No. 347,476

10 Claims. (Cl. 219—10)

My invention relates more particularly to hollow objects of elongated or tubular construction formed by electrical butt welding and to a method of welding by which a continuous sheet of metal may be electrically butt welded on a longitudinal seam without the necessity of using a prohibitive volume of electric current. In electric butt welding in order to bring the edges of the metal to be welded to a welding temperature it is necessary to use a considerable concentration or volume of current per unit of area of the surfaces being joined. This imposes a difficulty in the formation of longitudinal seams in hollow objects such as pipes and tubes, in that the quantity of electricity available in welding apparatus of commercial size has heretofore limited such seams to a length too short for many commercial purposes.

An object of my present invention is to provide a method by which an integral, single sheet of metal may be welded on a longitudinal seam of any desired length by a limited electric current.

Another object of the invention is to provide a construction for elongated or tubular objects that permits such objects to be electrically welded on their longitudinal seams in successive, relatively short welded seams.

Further objects and features of the invention are to provide a method by which a welded pipe of any size or dimension may be readily formed by electric welding, and in which the welding operations of a longitudinal seam may be localized in a series of seams of limited length.

With these and other objects in view, the invention comprises welded objects and the methods described and set forth in the following specification.

The various features of the invention are illustrated in the accompanying drawings, in which—

Fig. 1 is a perspective view of a portion of a pipe or tubular object formed by my present invention.

Fig. 2 is a similar perspective view of a portion of the pipe partly formed, according to the method of the present invention.

Fig. 3 is a plan view of a portion of the tubular object shown in Fig. 2.

Fig. 7 is a perspective view similar to that of Fig. 2 of a method of forming a tubular object and Figs. 8 and 9 are cross sectional views taken on lines 8—8 and 9—9, respectively, of Fig. 7.

Figure 4:
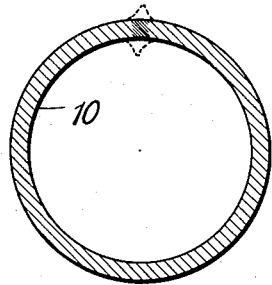
Fig. 4 is a cross sectional view of the object during its process of formation taken on line 4—4 of Fig. 2.
Figure 5:
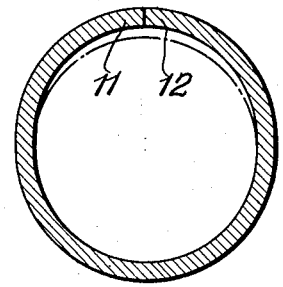
Fig. 5 is a similar cross sectional view taken on line 5—5 of Fig. 2.

Referring more particularly to Figs. 1–6 inclusive of the accompanying drawings, a sheet of metal 10 of a length equal to the length of the object to be formed and of a width somewhat greater than the circumference of the finished object, is bent to a tubular form with its longitudinal edges 11 and 12 abutting as shown in Figs. 2 and 5. A series of transverse slots of limited length are then cut, as at 13, 14 and 15, in the sheet of metal transversely of the abutting edges 11 and 12.

Figure 6:
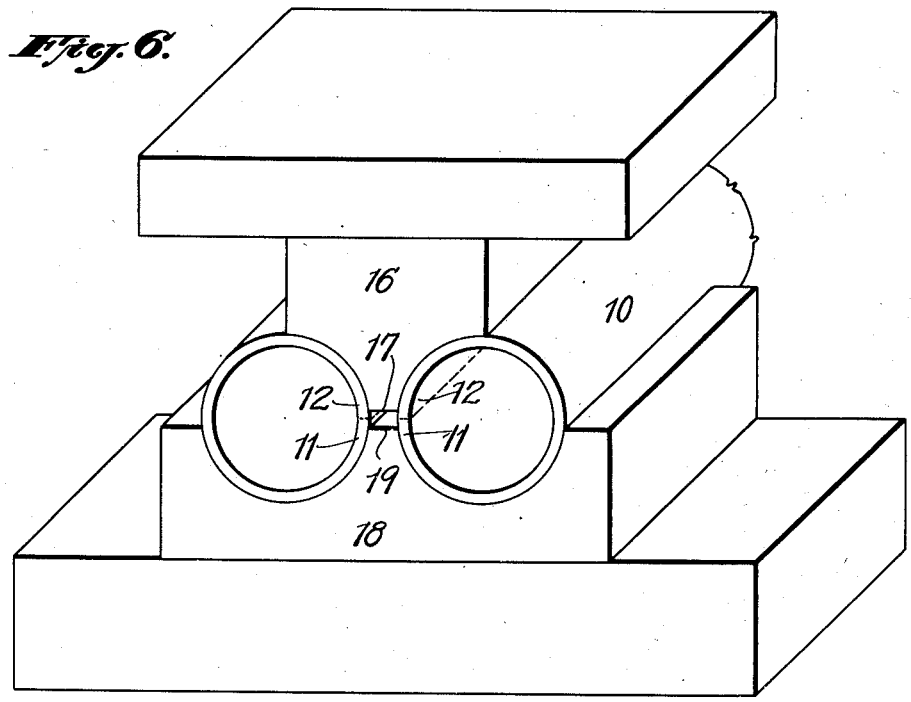
Fig. 6 is a perspective view of an electric welding apparatus for welding tubular objects by the method of the present invention.

A length of the tubularly shaped sheet of metal between the end of the first transverse slot at 13, is placed, as shown in Fig. 6, between an upper electrode 16 having a curved surface extending downwardly to a lower edge 17, and a lower electrode 18 having a curved surface to receive the curved sheet of metal and extending upwardly to an upper edge 19, the abutting edges 11 and 12 being positioned between the edges 17 and 19 so that the metal immediately adjacent these abutting edges will form the shortest and most direct path for current between the two electrodes. It will be understood that but a single seam may be welded in an operation or, as shown in Fig. 6, two tubular objects to be joined may be placed between the electrodes and both welded longitudinally at a single operation. As indicated in Figs. 2, 4 and 5, the take-up in metal in the welding of the edges 11 and 12 causes the diameter of the tubular object to decrease, this decrease being permitted by a bending of the metal between the ends of the transverse slots.

When the welding between the first section of pipe and the first slot is completed, the pipe and succeeding length of metal between the slots at 13 and 14 is advanced and placed between the electrodes and the welding repeated until the longitudinal edges between each of the transverse slots have been individually welded to each other. There is thus formed an elongated or tubular article having a series of aligned lengths of electrically butt welded joints or seams separated by short narrow transverse slots. These transverse slots are then welded by arc or gas welding with the application of a welding metal which thereby avoids the necessity for taking up metal as is required in butt welding.

In forming certain types of hollow elongated objects of certain diameters the metal sheet need not be rolled to an approximately circular cross section but may be given the shape shown in Figs.

7, 8 and 9 before being welded. In this case the metal is bent intermediate its longitudinal edges in a semi-circular bend, as at 20, and having a pair of slightly diverging flat surfaces 21 and 22 at each side of the central semi-cylindrical bend 20, and curved inwardly at 23 and 24 to a central seam 25. Transverse slots are then cut as in the preceding example, and the abutting edges between successive transverse slots are welded to form a tubular object having the cross sectional shape shown in Fig. 8. The transverse slots may then be closed by arc or gas welding and the tubular object may then be brought to a cylindrical form or circular cross section by the methods disclosed in Patent No. 1,534,133, issued April 21, 1925.

It will be understood that the transverse slots 13, 14, 15, etc., may be spaced at any distance to accommodate the size and capacity of the welding apparatus and the length of the longitudinal seam is, therefore, not limited by the capacity of the welding apparatus or the current available for welding.

The invention is of special importance in connection with electrical resistance butt-welding as explained above; but it is applicable also with advantage to other butt-welding methods.

As changes of construction and method can be made within the scope of my invention, it is intended that all matter contained in the above description or shown in the accompanying drawings shall be interpreted as illustrative and not in a limiting sense.

What I claim is:

1. A method of forming an article of the type described which comprises forming a sheet of metal to an elongated hollow shape with its edges meeting on a longitudinal seam and with slots intersecting said seam, successively electrically butt welding said abutting edges in a longitudinal seam between successive slots, and welding said transverse slots.

2. A method of forming articles of the type described which comprises forming a sheet of metal to an elongated hollow shape with edges abutting in a longitudinal seam and with transverse slots intersecting said seam, successively electrically butt welding the abutting edges of said sheet on longitudinal seams between successive transverse slots, and filling said transverse slots with a welding metal.

3. A method of forming articles of the type described which comprises forming a sheet of metal to an elongated hollow form with edges abutting in a longitudinal seam and with transverse slots intersecting said seam at intervals, electrically butt welding said longitudinal seam in successive steps between said slots, closing said slots with metal, and shaping said articles to cylinders of substantially circular cross section.

4. A method of forming articles of the type described which comprises forming a sheet of metal to an elongated hollow shape with its edges meeting on a longitudinal seam interrupted at spaced intervals, and successively electrically butt welding said interrupted portions of said seam.

5. A method of forming an article of the type described which comprises forming a sheet of metal to an elongated hollow shape with its edges meeting on a longitudinal seam forming slots intersecting said seam, successively electrically butt welding said abutting edges in a longitudinal seam between successive slots, and welding said transverse slots.

6. A method of forming articles of the type described which comprises forming a sheet of metal to an elongated hollow shape with edges abutting in a longitudinal seam forming transverse slots intersecting said seam, successively electrically butt welding the abutting edges of said sheet on longitudinal seams between successive transverse slots, and filling said transverse slots with a welding metal.

7. A method of forming articles of the type described which comprises forming a sheet of metal to an elongated hollow form with edges abutting in a longitudinal seam forming transverse slots intersecting said seam at intervals, electrically butt welding said longitudinal seam in successive steps between said slots, closing said slots with metal, and shaping said articles to cylinders of substantially circular cross section.

8. A method of forming an article of the type described which comprises slotting the longitudinal edges of a sheet of metal, forming said sheet of metal to an elongated hollow shape with its edges meeting on a longitudinal seam and said slots intersecting said seam, successively electrically butt welding said longitudinal edges in a longitudinal seam between successive slots and welding said transverse slots.

9. A method of forming articles of the type described which comprises forming transverse slots in the longitudinal edges of a sheet of metal, forming said sheet of metal to an elongated hollow shape with its longitudinal edges abutting, successively electrically butt welding the abutting longitudinal edges of said sheet on longitudinal seams between successive transverse slots and filling said transverse slots with a welding metal.

10. A method of forming articles of the type described which comprises cutting slots at spaced longitudinal intervals transversely from the longitudinal edges of a sheet of metal, forming said sheet of metal to an elongated hollow form with its longitudinal edges abutting, electrically butt welding said longitudinal edges in successive spaces between said slots, closing said slots with metal and shaping said articles to cylinders of substantially circular cross section.

THOMAS E. MURRAY, Jr.